Patented Mar. 23, 1954

2,673,191

UNITED STATES PATENT OFFICE 2,673,191

LIGHT STABLE VINYLIDENE CHLORIDE POLYMER COMPOSITIONS

Robert J. Wolf, Cleveland, Ohio, assignor to The B. F. Goodrich Company, New York, N. Y., a corporation of New York No Drawing. Application May 3, 1951, Serial No. 224,449

4 Claims. (Cl. 260—45.5)

The present invention relates to the production of light stable vinylidene chloride polymer compositions and pertains particularly to the production of light stable and tack-free thin films and coatings from aqueous vinylidene chloride polymer compositions.

Vinylidene chloride polymers, produced by the polymerization of vinylidene chloride alone or in admixture with one or more other monoolefinic polymerizable materials, are well known to be useful in the production of molded plastic articles, thin films, monofilaments, etc. The copolymers of vinylidene chloride with vinyl chloride, vinyl acetate and acrylonitrile are particularly useful in these applications. In addition, multi-component interpolymers of vinylidene chloride, vinyl chloride and an alkyl acrylate such as ethyl acrylate, in the form of aqueous dispersions, have the unique property of forming, on air drying at 25 to 50° C., soft, clear and extensible films which are highly resistant to the action of grease and to penetration by water vapor and the like. Such vinylidene chloride interpolymer latices have found interesting applications as plasticizer-free antitranspirant coating compositions, as sticker agents in bactericidal and fungicidal compositions, and as coating materials for paper etc. in the production of packaging materials.

As a class, however, the vinylidene chloride polymers suffer from the defect of being unstable to the action of heat and light, particularly to the latter. The vinylidene chloride, vinyl chloride and alkyl acrylate interpolymers suffer from the additional defect of being slightly sticky or tacky at slightly elevated temperatures of 75 to 150° F. or more.

I have found that vinylidene chloride polymers and their compositions may be rendered stable to light (ultra-violet) by incorporating in the vinylidene chloride polymer, or a composition containing such a polymer, a minor amount of a stabilizer comprising a water-soluble salt of a polymeric polycarboxylic acid, or a hydroxymethyl ammonium salt of a polymeric amic acid made by reacting the ammonium salt of a polymeric polycarboxylic acid with formaldehyde. Vinylidene chloride polymers containing the water-soluble salts of polymeric polycarboxylic acids or anhydrides are greatly improved in their stability to light, and such polymers containing such hydroxymethyl derivatives not only possess improved light stability but are also rendered less sticky and tacky.

The vinylidene chloride polymers which are stabilized by the addition of the light stabilizers of this invention are any of those made from monoolefinic polymerizable material containing a significant amount, that is, more than about 5% by weight, of vinylidene chloride. While the nature of the remainder of the monoolefinic polymerizable material is not critical, it is preferably vinyl chloride or a mixture of vinyl chloride and alkyl acrylate. As the amount of vinylidene chloride monomer in the polymerizable material is increased, the resulting polymers are increasingly more stabilized by the water-soluble salts of the polymeric polycarboxylic acids. The stabilizing effect is very noticeable with polymers made from monoolefinic monomeric mixtures containing at least 20% or more of vinylidene chloride and is especially significant with polymers predominating in vinylidene chloride, being most pronounced in polymers made from monomeric mixtures comprising 75 to 90% vinylidene chloride, 5 to 15% of vinyl chloride and 5 to 15% of an alkyl acrylate. The vinylidene chloride polymers may be made by any conventional method, although the extremely high molecular weight polymers produced by polymerization in aqueous suspension or emulsion are especially benefited by the stabilizing agents of this invention.

The light stabilizing agents of this invention which are water-soluble salts of polymeric polycarboxylic acids are made by reacting a polymeric polycarboxylic acid or anhydride with ammonia, aqueous ammonium hydroxide, a primary alkyl amine, a mixture of primary alkyl amines, or an alkali metal hydroxide such as sodium, potassium or lithium hydroxide. Examples of suitable primary alkyl amines which can be utilized alone or in admixture are methyl, ethyl, propyl, butyl, amyl, hexyl, octyl, decyl, dodecyl, octadecyl and other amines.

The term "polymeric polycarboxylic acid" as used herein refers to interpolymers obtained by condensing or polymerizing a polymerizable organic compound containing a single ethylenic bond as the sole aliphatic carbon-to-carbon unsaturation with a polymerizable polycarboxylic acid or its anhydride. Suitable ethylenically-unsaturated organic compounds for use in preparing the polymeric polycarboxylic acid or anhydride include styrene and the substituted styrenes, methyl methacrylate and similar alkyl esters of alpha-alkyl acrylic acids, acrylonitrile, vinylidene chloride, ethylene, isobutylene, and others. It is greatly preferred to utilize monoolefinic hydrocarbons containing the ethylenic bond in a $CH_2=C<$ group and of these styrene is greatly preferred. The polymerizable polyunsaturated carboxylic acids and anhydrides which may be utilized include fumaric acid, maleic acid, phenyl maleic acid, benzyl- and dibenzyl maleic acids, ethyl maleic acid, and other substituted maleic and fumaric acids, and their anhydrides. Such anhydrides, which are preferably used, possess the structure

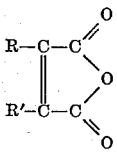

wherein R and R' are selected from hydrogen, and alkyl, aryl, aralkyl and cycloalkyl groups, maleic anhydride being the compound especially preferred.

The polymeric polycarboxylic acids are produced by condensation or polymerization at temperatures of 30 to 150° C. or more and in the presence of catalysts such as any of the organic and inorganic peroxygen compounds. The polymerization may be conducted in a solvent or diluent or without a solvent or diluent. Suitable methods for making the preferred styrene maleic acid or anhydride interpolymers are disclosed in U. S. Patents 2,047,398 and 2,378,629. The proportions of monoolefin and unsaturated acid or anhydride in the monomer mixture may be varied considerably providing sufficient acid or anhydride is utilized to obtain a polymer which when converted to a salt will be water-soluble. For this purpose, from 10 to 90% of the monoolefinic compound and 10 to 90% of the acid or anhydride usually will be sufficient.

The stabilizers which are ammonium salts of N-hydroxymethyl polymeric amic acids, are produced by reacting formaldehyde with an ammonium salt of a polymeric polycarboxylic acid, as is described in U. S. Patent 2,504,003. These materials are effective light stabilizers for vinylidene polymers and have an additional advantage of being insolubilized by the application of heat. When used in aqueous dispersions of vinylidene chloride polymers, they are preferably produced in situ from formaldehyde and the appropriate ammonium salt. Vinylidene chloride polymers containing these salts are not tacky and in the form of thin films or coatings are of exceptional clarity and resistance to the deleterious influence of ultra-violet light.

The amount of stabilizer to be used according to this invention may be varied somewhat from as little as 0.5% to as much as 15% by weight based on the weight of the vinylidene chloride polymer. When producing light stabilization with a water-soluble salt of a polymeric polycarboxylic acid, amounts ranging from 0.5 to 10% usually will be found sufficient. When, however, an ammonium salt is to be reacted with formaldehyde to produce also a detackifying action it is usually necessary to utilize from 3 to 15% by weight of the ammonium salt along with an amount of formaldehyde slightly in excess of that required to react with the salt.

The invention is further illustrated by the following specific examples which are intended as being illustrative of the invention and not as limitations on the scope thereof.

*Example 1*

A tripolymer latex prepared by the polymerization in aqueous emulsion of a mixture consisting of about 77 parts of vinylidene chloride, about 11.5 parts of vinyl chloride and about 11.5 parts of ethyl acrylate is stabilized by the addition of the ammonium salt of a styrene maleic anhydride copolymer, a suitable commercial material being known as "Amberlite W-1." One and three parts, respectively, of the water-soluble ammonium salt per 100 parts of latex polymer solids are added directly to separate portions of the tripolymer latex along with 1 part of hydroxyethyl cellulose as a thickener and the resulting thickened and stabilized latex samples utilized to cast unsupported films of about 10 mils in thickness. The films are dried in air at 30° C. The resulting films along with a control film made from another portion of the tripolymer latex but without the ammonium polymeric salt are exposed to ultra-violet light in an Atlas fadeometer. The film made without the ammonium salt is initially discolored in less than 20 hours and fails (cracks) in 20 to 50 hours. By contrast, the film containing one part of the ammonium salt is not discolored until 60 to 80 hours and does not fail until 100 to 140 hours. The film made with three parts of the ammonium salt is not discolored until 80 to 140 hours and does not fail until 240 to 260 hours.

The effect noted above apparently is unique to polymers of vinylidene chloride for when a blended latex containing 30 parts of a low molecular weight butadiene acrylonitrile copolymer and 70 parts of polyvinyl chloride is similarly treated with 1 and 3 parts of the ammonium salt of the styrene maleic anhydride copolymer the films produced therefrom fail in 60 hours while the untreated film of this latex does not fail in 100 hours. Similarly, films made from a latex of a copolymer of 80% vinyl chloride and 20% methyl acrylate containing 35 parts of emulsified di-2-ethylhexyl phthalate plasticizer will not discolor or fail for 300 hours in the fadeometer while the addition of 1 to 3 parts of the ammonium salt causes them to discolor and fail in 260 hours. Thus, the ammonium salt of the styrene maleic anhydride copolymer is a light stabilizer for the vinylidene chloride polymer and appears to be deleterious in polymers not containing vinylidene chloride.

*Example 2*

A solid copolymer resin made by the aqueous suspension polymerization of a mixture consisting of 80% vinyl chloride and 20% vinylidene chloride is compounded as follows:

| | Sample 1 | Sample 2 |
|---|---|---|
| Copolymer Resin | 100.0 | 100.0 |
| Atomite | 100.0 | 100.0 |
| Dow 276 V 2 (poly-alpha-methyl styrene) | 10.0 | 10.0 |
| Dibasic lead phosphite | 10.0 | 10.0 |
| Ammonium salt of styrene maleic anhydride copolymer | ---------- | 2.0 |

The ingredients are milled for 15 minutes at 250° F. The resulting plastic composition is press-molded between ferrotype plates for 5 minutes at 300° F. The resultant smooth molded sheets are then exposed in the Atlas fadeometer. Sample 1 shows a slight discoloration in 60 hours, is badly discolored in 100 hours and cracks at 180 hours. Slight discoloration of Sample 2 is not evident until 120 hours and the sample is cracked at 180 hours exposure but shows only slight discoloration at that time.

Substantially similar results are shown by vinyl chloride vinylidene chloride polymers made from monomeric mixtures containing, respectively, 12.5% vinylidene chloride and 7.5% vinylidene chloride. The stabilizing effect, however, is more pronounced as the per cent of vinylidene chloride in the copolymer is increased.

Example 3

A tripolymer latex similar to that of Example 1 is stabilized by the addition of 5 parts of an ammonium salt of a styrene maleic anhydride copolymer. To the latex there is then added 2 parts on the polymer of formaldehyde as a 10% aqueous solution and the latex heated and agitated for 5 minutes at 50° C. to form in situ the ammonium salt of N-hydroxymethyl styrene/maleamic acid. One part of hydroxyethyl cellulose is then added as a thickener. Film cast from this composition and heated to 150° C. for 5 to 15 minutes is extremely resistant to the effects of light and has considerably less surface tack than an untreated latex cast film of the same tripolymer and is further characterized by unusual clarity as compared to an untreated film.

Results similar to those of the preceding examples are obtained by the use of the ammonium, alkyl amine and alkali metal salts of other polymeric polycarboxylic acids, for example, of ethylene maleic anhydride copolymers and isobutylene maleic anhydride copolymers, methyl methacrylate maleic anhydride polymers, and others.

While I have disclosed certain preferred manners of performing my invention, I do not thereby desire or intend to limit myself solely thereto, for the precise proportions of the materials utilized may be varied and equivalent chemical materials may be employed, if desired, without departing from the spirit and scope of the invention as defined in the appended claims.

I claim:

1. A light-stable composition comprising a polymer of a monomeric mixture comprising from 75 to 90% by weight of vinylidene chloride, 5 to 15% vinyl chloride and 5 to 15% of ethyl acrylate and a minor amount of a water-soluble ammonium salt of a styrene maleic anhydride copolymer.

2. A light-stable and tack-free polymer composition comprising a polymer of a monomeric mixture comprising from 75 to 90% by weight of vinylidene chloride, 5 to 15% by weight of vinyl chloride and 5 to 15% by weight of ethyl acrylate and a minor amount of a reaction product of an ammonium salt of a styrene/maleic anhydride copolymer with formaldehyde.

3. A light-stable composition comprising an interpolymer of a monomeric mixture comprising from 75 to 90% by weight of vinylidene chloride, 5 to 15% by weight of vinyl chloride, and 5 to 15% by weight of alkyl acrylate and a minor amount of a hydroxymethyl ammonium salt of a polymer of a monomeric mixture of a polymerizable organic compound containing a single olefinic double bond and an acid anhydride having the structure

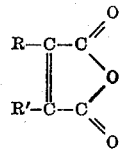

wherein R and R' are selected from the group consisting of hydrogen, alkyl, aryl, aralkyl and cycloalkyl groups, said hydroxymethyl ammonium salt polymer prepared by reacting an ammonium salt thereof with formaldehyde.

4. The method of producing light-stable and tack-free coatings and unsupported films which comprises adding to a polymeric dispersion comprising the polymerization product in aqueous emulsion of a monomeric mixture comprising from 75 to 90% by weight vinylidene chloride, 5 to 15% by weight vinyl chloride, and 5 to 15% by weight of an alkyl acrylate a minor amount of a stabilizer comprising an ammonium salt of a styrene-maleic anhydride copolymer and a sufficient quantity of formaldehyde to react with said salt of the styrene-maleic anhydride copolymer, and thereafter depositing a thin coating or film of the resulting composition and applying heat to dry the coating or film and insolubilize the salt of the styrene-maleic anhydride copolymer.

ROBERT J. WOLF.

References Cited in the file of this patent
UNITED STATES PATENTS

| Number | Name | Date |
|---|---|---|
| 2,490,677 | Cupery | Dec. 6, 1949 |